United States Patent [19]
Blanke

[11] Patent Number: 6,108,522
[45] Date of Patent: Aug. 22, 2000

[54] RADIO COMMUNICATION SYSTEM WITH A STATIONARY AND A MOBILE RADIO DEVICE

[75] Inventor: Gero Blanke, Murr, Germany

[73] Assignee: Alcatel, Paris, France

[21] Appl. No.: 09/082,325

[22] Filed: May 21, 1998

[30] Foreign Application Priority Data

May 28, 1997 [DE] Germany .......................... 197 22 219

[51] Int. Cl.$^7$ ................................................ H04B 7/24
[52] U.S. Cl. ........................... 455/39; 455/509; 370/431
[58] Field of Search ........................... 455/39, 450, 452, 455/509, 510, 511; 370/437, 348, 329

[56] References Cited

U.S. PATENT DOCUMENTS

| | | | |
|---|---|---|---|
| 5,517,504 | 5/1996 | Tran et al. ............................. | 370/347 |
| 5,625,878 | 4/1997 | Lopponen et al. ..................... | 455/509 |
| 5,680,398 | 10/1997 | Robinson ............................... | 370/458 |
| 5,752,193 | 5/1998 | Scholefield et al. .................... | 455/452 |
| 5,884,145 | 3/1999 | Haartsen ................................. | 455/63 |
| 5,898,929 | 4/1999 | Haartsen ................................. | 455/462 |

FOREIGN PATENT DOCUMENTS

| | | | |
|---|---|---|---|
| 0268375 | 5/1988 | European Pat. Off. ............... | 455/500 |
| 0652680 | 5/1995 | European Pat. Off. ............... | 455/403 |
| 0762787 | 3/1997 | European Pat. Off. ............... | 455/403 |
| 3337648 | 2/1987 | Germany ............................... | 455/500 |
| 196 10 086 | 9/1997 | Germany ............................... | 455/403 |

OTHER PUBLICATIONS

"The GSM System for Mobile Communications" by M. Mouly and M. Pautet, 1992, Palaiseau, France, pp. 192–193, 206–210, 316–319, 424–429.

J. Biala, "Mobilfunk und Intelligente Netze", Vieweg & Sohn Verlagsgesellschaft mbH, Braunschweig/Wiesbaden, 1995, pp. 93–96.

*Primary Examiner*—William G. Trost
*Assistant Examiner*—Erika A. Gary
*Attorney, Agent, or Firm*—Ware, Fressola, Van Der Sluys & Adolphson LLP; Milton Oliver

[57] ABSTRACT

It is proposed to create a new radio communication system (SYS) which is based primarily on existing technologies, by using a stationary and a mobile radio device (DBS; MMS) with standard technology. The radio devices are modified in such a way that for setting up the radio link between the radio devices, at least one of the radio devices (MMS) transmits in the opposite direction of the radio protocol (PGSM) one of the radio signals (FB) which is actually intended to be transmitted by the other radio device (DBS). For example, the radio signal (FB, frequency correction burst) which is intended only for the downward direction (DL, downlink) is here transmitted in the upward direction (UL, uplink). This modification requires only changes in the control software for the transmitter in the mobile radio device and for the receiver in the stationary radio device.

10 Claims, 3 Drawing Sheets

RADIO COMMUNICATION SYSTEM WITH A STATIONARY AND A MOBILE RADIO DEVICE

BACKGROUND OF THE INVENTION

1. Technical Field

The invention relates to a radio communication system with a stationary radio device and a mobile radio device.

The invention also relates to a mobile radio device and a stationary radio device for such a radio system as well as to a method for setting up a radio link with such a radio communication system.

2. Discussion of Related Art

A conventional radio communication system with a stationary radio device and a mobile radio device, both of which exchanging radio signals via a radio link, is known from the book "The GSM System for Mobile Communications" which was privately published in 1992 by the authors M. Mouly and M. -B. Pautet in Palaiseau, France. The radio communication system described in the book is the public mobile radio system "Global System for Mobile Communications" (abbreviated GSM) whose technical components comply with the standard "GSM" with the same name. According to this standard, there is provided a radio protocol governing the exchange of radio signals via the radio link between the stationary radio devices—also referred to as base stations- and the mobile radio devices—also referred to as mobile stations. The book by M. Mouly and M. -B. Pautet describes on pp. 192–193 in chapter 4.1.3.1 that the radio channels FCCH (Frequency Correction CHannel) and SCH (Synchronization CHannel) are provided for the base station, on which channels only the base station is allowed to transmit. These radio channels FCCH and SCH are adapted to transmit signaling data in the downward direction and are therefore also referred to as "downlink channel". This book also describes that the radio channel RACH (Random Access CHannel) is provided for the mobile station, on which channel only the mobile station is allowed to transmit. This radio channel RACH is adapted to transmit signaling data in the upward direction and is therefore also referred to as "uplink channel".

In summary, a radio communication system is known which includes a stationary radio device (base station) and a mobile radio device (mobile station), both of which exchange radio signals with each other via a radio link according to a predetermined radio protocol, wherein first radio signals are provided on the channels FCCH and SCH exclusively for transmission by the stationary radio device and second radio signals are provided on the channel RACH exclusively for transmission by the mobile radio device.

A design of a new radio communication system should be based as much as possible on already existing technology in order to save development costs. If the design of a new radio communication system were based on the commonly used GSM mobile radio technology, then the following problems would have to be solved: the new radio communication system and the existing GSM mobile radio systems could interfere with each other due to radio interference problems. The new radio communication system could then only be used in such areas which are not yet serviced by a GSM mobile radio system. Alternately, a radio communication system would have to be based on a completely new design.

EP-A-268 375 proposes to create a new cellular radio system which could be used as a private radio communication system, by providing the base stations with a scanning receiver in conjunction with a completely new radio protocol. The so-called DECT radio system (Digital Enhanced Cordless Telephone) is essentially such a novel radio system which, however, necessitated extensive new developments.

SUMMARY OF INVENTION

It is therefore the object of the invention to provide a new radio communication system which is based to the greatest possible extent on already existing technology. The new radio communication system should be usable also in those regions which are already serviced by existing radio communication systems. It is particularly desirable that the new radio communication system can be designed as a private mobile radio system.

According to a first aspect of the invention, a radio communication system (SYS) with a stationary radio device (DBS) and mobile radio device (MMS), with both devices exchanging information with each other via a radio link (RIF) according to a predetermined radio protocol (PGSM), wherein first radio signals (FB) are provided for exclusive transmission by the stationary radio device (DBS) and second radio signals are provided for exclusive transmission by the mobile radio device (MMS), is characterized in that for establishing the radio link (RIF), at least one of the radio devices (MMS) transmits in the opposite direction of the radio protocol (PGSM) one of the radio signals (FB) which, according to the PGSM, are actually for transmission by the other radio device (DBS).

A radio communication system is proposed which includes a stationary radio device and mobile radio device, with both devices exchanging information with each other via a radio link according to a predetermined radio protocol, wherein first radio signals are provided for exclusive transmission by the stationary radio device—i.e. radio signals transmitted in the downward direction (downlink)—and second radio signals are provided for exclusive transmission by the mobile radio device—i.e. radio signals transmitted in the upward direction (uplink), wherein for establishing the radio link, at least one of the radio devices transmits in the opposite direction of the radio protocol one of the radio signals which are actually intended to be transmitted by the other radio device.

According to a second aspect of the invention, a mobile radio device (MMS) for a radio communication system (SYS) with a stationary radio device (DBS) which exchanges radio signals with the mobile radio device (MMS) via a radio link (RIF) according to a predetermined radio protocol (PGSM), wherein first radio signals (FB) are provided for exclusive transmission via the stationary radio device (DBS) and second radio signals are provided for exclusive transmission by the mobile radio device (MMS), is characterized in that for setting up the radio link (RIF), the mobile radio device (MMS) transmits in the opposite direction of the radio protocol (PGSM) one of the first radio signals (FB) which, according to the PGSM, are actually for transmission by the stationary radio device (DBS).

According to a third aspect of the invention, a stationary radio device (DBS) for a radio communication system (SYS), wherein the stationary radio device (DBS) exchanges radio signals with a mobile radio device (MMS) via a radio link (RIF) according to a predetermined radio protocol (PGSM), wherein first radio signals (FB) are provided for exclusive transmission by the stationary radio device (DBS) and second radio signals are provided for exclusive transmission by the mobile radio device (MMS), is characterized in that for setting up the radio link, the stationary radio device transmits in the opposite direction of the radio protocol one of the second radio signals which, according to the PGSM, are actually for transmission by the other radio device.

Also proposed is a method for setting up a radio link in such a radio communication system with a stationary radio device and a mobile radio device, both of which exchanging radio signals with each other according to a predetermined radio protocol, wherein first radio signals are provided for exclusive transmission by the stationary radio device and second radio signals are provided for exclusive transmission by the mobile radio device, wherein in a first step for setting up the radio link at least one of the radio devices transmits in the opposite direction of the radio protocol one of the radio signals which are actually intended to be transmitted by the other radio device.

The proposed radio communication system can then be designed with components, for example stationary and mobile radio devices, which can be developed inexpensively by modifying already existing components of a conventional radio system. The existing radio devices require only small modifications of, in particular, those control elements, which control the execution of the radio communication according to the predetermined radio protocol. In radio devices with digital control elements having a micro-processor, only the control software has to modified.

The invention is based on the observation that conventional radio devices cannot receive, demodulate or decode radio signals which are transmitted in the wrong transmission direction, i.e. in the opposite direction of the conventional radio protocol. Consequently, these radio signals do not interfere with the reception of the existing radio devices of conventional radio systems. Interference effects are also lessened because the radio signal does not have to be transmitted continuously, as is customary, e.g., in the GSM system, where transmission is continuous on the BCCH. Furthermore, the possibility that an undesirable radio link is established between a new radio device (e.g. a new mobile station) and an existing radio device (e.g. an existing GSM base station), is eliminated.

The new radio devices, on the other hand, are capable of correctly receiving the radio signals transmitted in the wrong transmission direction. The new radio devices recognize each other so that a radio link can be set up quickly and easily.

The invention provides new radio devices which operate in the opposite direction of an existing radio protocol at least during the set up phase of the radio link, i.e. which operate according to a new modified radio protocol. If, for example, the GSM protocol is modified, then the base station does not have to transmit continuously on the BCCH.

A potential interference with other interfering radio devices is thereby prevented.

BRIEF DESCRIPTION OF THE DRAWING

The invention will be described hereinafter with reference to an embodiment. Reference is made here to the following schematic drawings which illustrate in.

DETAILED DESCRIPTION OF A PREFERRED EMBODIMENT

Figure 1:
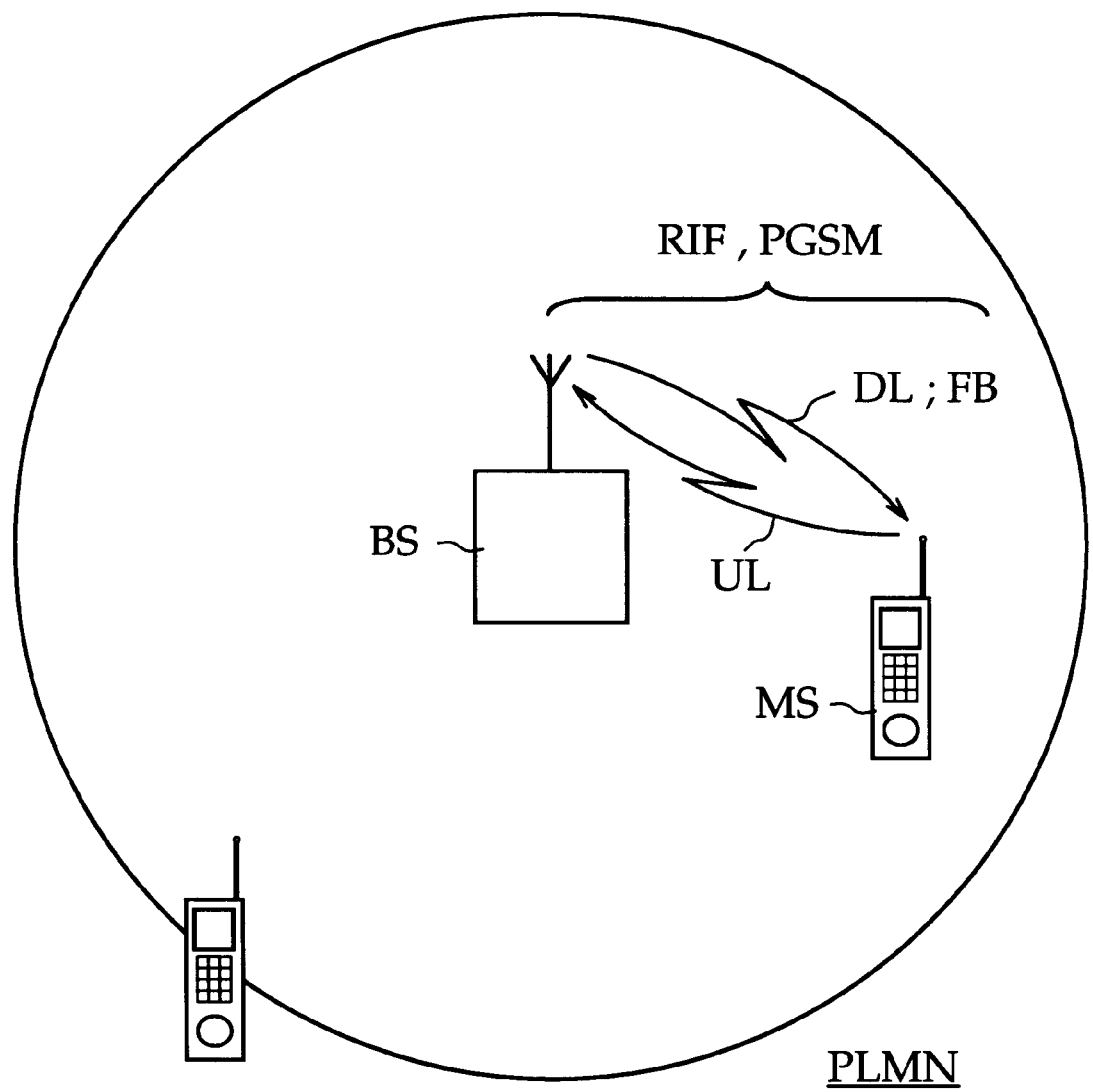
FIG. 1 the set-up of a conventional radio system.

FIG. 1 shows schematically the configuration of a conventional radio system, i.e. the configuration of a public cellular mobile radio system PLMN. Only a single radio cell of the mobile radio system is shown to simplify the drawing. Each radio cell is supplied by a stationary radio device BS, subsequently also referred to as base station. The base station BS is capable of exchanging radio signals with several mobile radio devices, subsequently also referred to as mobile stations. Only one mobile station MS is shown in FIG. 1, serving as an illustrative example for several mobile stations. The conventional mobile system depicted in FIG. 1 is designed according to the GSM standard (GSM: Global System for Mobile Communications). For the radio communication between the mobile stations and the base station according to the GSM standard, digital radio signals are exchanged via a radio link RIF using the TDMA access method (TDMA:

Time Division Multiple Access). The radio link RIF, subsequently also referred to as radio interface, is a FDD radio link (FDD: Frequency Division Duplex), i.e. a frequency duplex radio link with an upward direction UL, the so-called "uplink" and with a downward direction DL, the so-called "downlink". The "uplink" UL includes at least one carrier frequency which can be used by the mobile stations for transmission to the base station. The "downlink DL" includes a least one carrier frequency which can be used by the base station for transmission to the mobile stations.

For exchanging the radio signals, the GSM standard defines a radio protocol PGSM, according to which the radio link RIF is set up and according to which the radio communication is executed. This radio protocol which is known from the GSM standard, defines first radio signals which are provided for exclusive transmission by the base station, such as for example the radio signal FB provided for synchronizing the transmission and receive frequency, the so-called "frequency correction burst". The radio signal FB is generated in the base station based on a measurement in the receiver portion for determining the magnitude of the deviation of the transmission frequencies of the mobile stations from the predetermined target values. To correct the transmission frequencies in the mobile stations, the base station calculates for each mobile station MS a data value indicating the measured deviation—the so-called "frequency offset". In general, the deviation from the target value has to be within a predetermined tolerance range.

Figure 2:
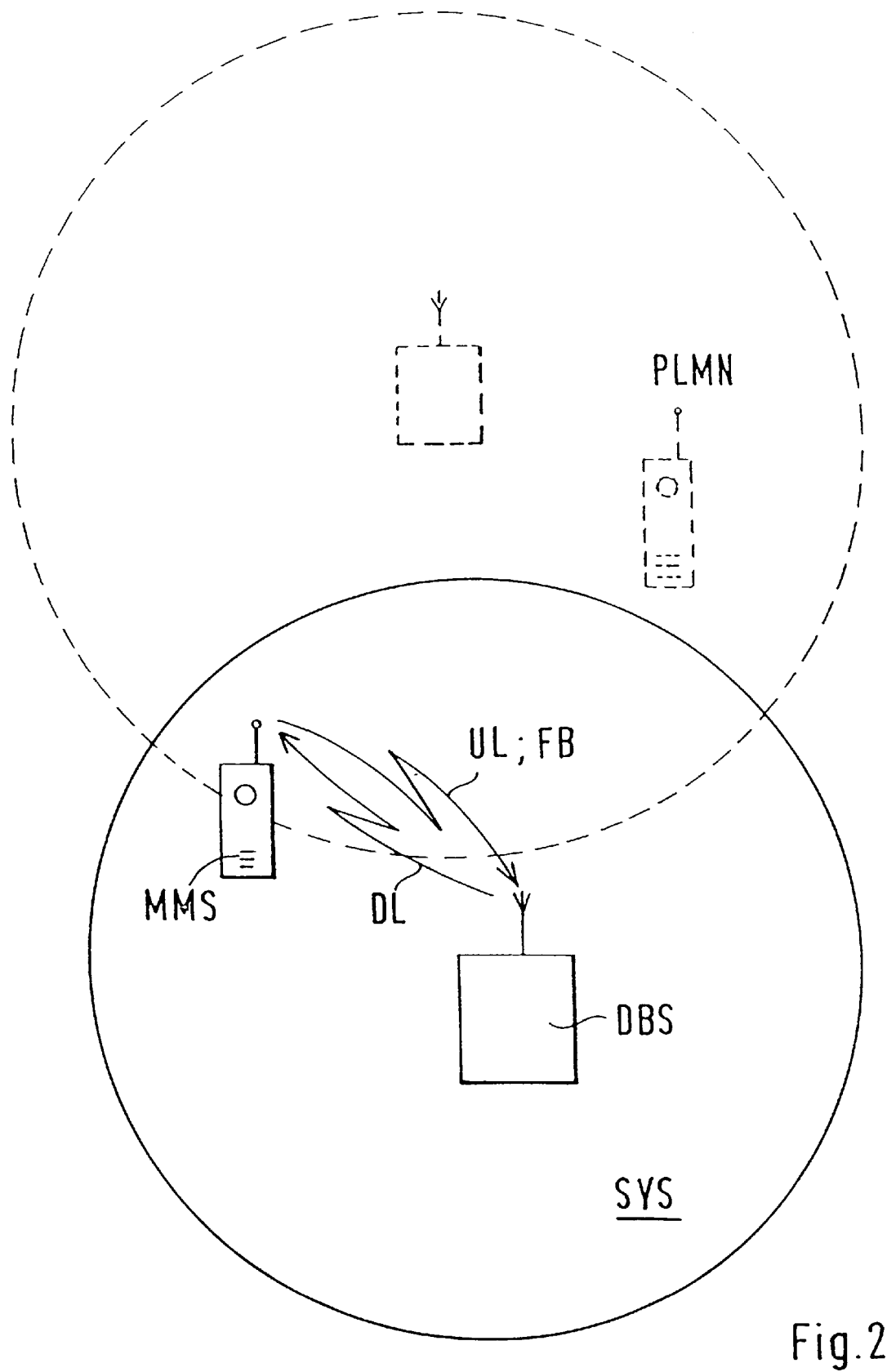
FIG. 2 the set-up of a radio system according to the invention.

In FIG. 2, there is schematically shown the configuration of a radio communication system SYS of the invention covering an area which partially overlaps with the afore-described public mobile radio system PLMN.

The illustrated radio communication system SYS includes only a single stationary radio device DBS servicing a single radio cell. The invention, however, is not restricted to the illustrated embodiment with only a single radio cell. The illustrated embodiment with a single radio cell is merely intended to provide a clear description of the invention. The following description clearly explains how the stated object is solved by the invention:

Aside from the stationary radio station DBS (also referred to as base station), the proposed radio system SYS also includes at least one mobile radio device MMS (also referred to as mobile station). For radio communication, the base station DBS and the mobile station MMS exchange radio signals in the downward direction DL and in the upward direction UL. If the radio link between the two stations DBS and MMS is already set up, then the radio signals are exchanged according to the conventional radio protocol known from the GSM standard. The radio protocol for setting up the radio communication, however, is slightly different from the conventional radio protocol in that at least some radio signals are used in the opposite direction of the conventional radio protocol.

Figure 3:
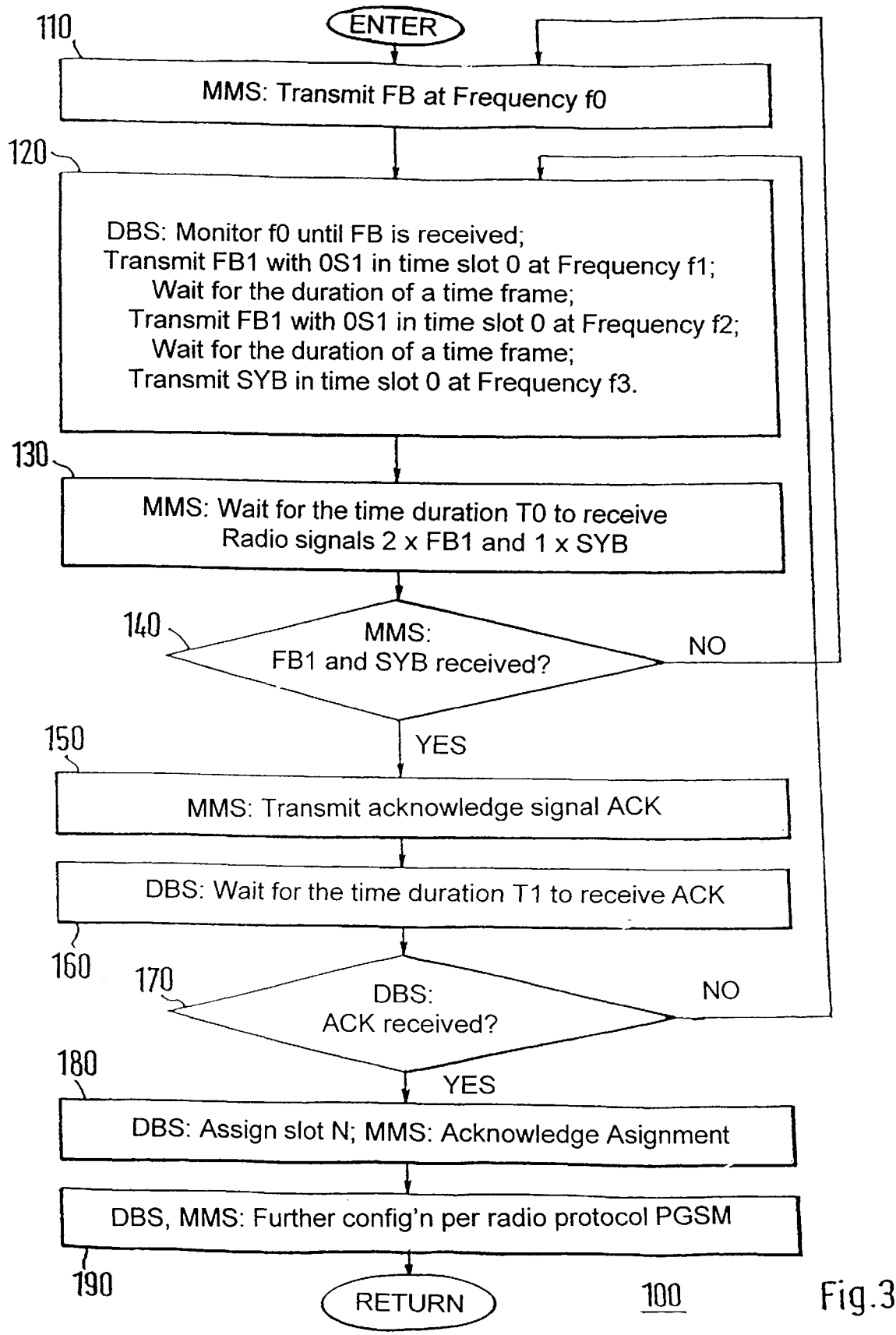
FIG. 3 the flow diagram for a method of the convention.

FIG. 3 depicts the flow diagram of a method 100 according to the invention for setting up the radio link.

The modified method consists essentially of the following new steps 110 to 190:

When the process is started, a radio signal FB is transmitted in a first step 110 from the mobile station MMS to the base station. The radio signal FB is the "frequency correction burst" already described above, which according to the GSM radio protocol is only intended for transmission from the base station. The mobile station which is still synchronized with the base station, transmits at an arbitrary point in time the radio signal FB at a frequency f0 which is provided for this purpose according to the radio protocol. However, if the mobile station is in possession of synchronization information about the base station, then the mobile station advantageously does not transmit the signal, as it would otherwise do, during the first time slot (this time slot number N=0), but rather during one of the other time slots (N=1, 2, 3 . . . or 7).

This eliminates interference with other radio devices. The radio signal FB advantageously also includes a data value characterizing the frequency deviation which is selected so as to unambiguously lie outside the conventional tolerance range.

In a subsequent step 120, the base station DBS which monitors the receive frequency f0, determines that a radio signal FB has been transmitted from a mobile station in the opposite direction of the customary radio protocol. Since a conventional mobile station is not capable of sending such a radio signal, it is determined that the radio signal FB must have been transmitted by a modified mobile station.

Advantageously, the "frequency correction burst" is employed, because this specific burst is fundamentally different from any other burst.

The base station transmits a radio signal FB1 in time slot 0 on the frequency f1. During the next time frame, the base station sends the radio signal FB1 again, however this time not on the previous frequency f1, but on a different frequency f2. Since the conventional radio protocol requires that the radio signal FB1 is transmitted only once, this method step 120 is also different from the conventional procedure. The stationary radio device DBS therefore transmits—in the opposite direction of the radio protocol—one of those radio signals (in this case FB1) several times which would otherwise be transmitted only once by this radio device. Advantageously, multiple transmission at different frequencies can make the transmission of the radio signal FB1 less susceptive to interference effects. Moreover, FB1 is not transmitted at the customary frequency f0. The base station DBS transmits FB1 in the opposite direction of the radio protocol not at the frequency f0, but at the two other frequencies f1 and f2. These measures, too, make the mobile radio devices according to the invention less susceptive to interference so that the transmitted radio signal FB1 is received correctly.

Moreover, the base station transmits an additional radio signal SYB in time slot 0 at the frequency f3 to provide synchronization. This radio signal can likewise be transmitted several times. The frequencies f1, f2 and f3 are preferably those frequencies which follow the frequency f0 according to a predetermined order (hopping sequence).

In the next two steps 130 and 140, the mobile station MMS waits to receive the radio signals FB1 and SYB and checks if all these radio signals have been received completely and correctly within a time duration T0.

If this is the case, then in a subsequent step 150 an acknowledge signal ACK is transmitted by the mobile station MMS indicating to the base station that the reception was correct. If the radio signals were not received completely or not received correctly by the mobile station, then the mobile station MMS transmits the radio signal FB again at the frequency f0 and the steps 110 to 140 are repeated. Consequently, the mobile radio device MMS repeatedly transmits one of the first radio signals (in this case FB) until the stationary radio station DBS answers. However, FB will not be transmitted repeatedly an infinite number of times, but rather only n times, e.g. 10 times. If the base station still does not answer, then the process is interrupted for a longer time, e.g. for about 15 minutes.

When the mobile station receives an answer from the base station (step 140), then the reception is acknowledged (step 150). The base station DBS checks in the subsequent steps 160 and 170, if the acknowledge signal ACK was received before the time Ti elapsed. If this is the case, then in additional steps 180 a free time slot N is assigned by the base station which the mobile station can access.

The mobile station confirms the assignment of the time slot.

If it is detected in steps 160 and 170, that the acknowledge signal ACK has not been received before the time T1 elapsed, then the base station again monitors reception of the radio signal FB at the frequency f0. The steps 120 to 170 are then repeated until the acknowledge signal ACK is received by the base station within the presettable time duration T2.

In the subsequent steps 180, 190, the radio link continues to be configured according to the radio protocol PGSM.

The invention is not restricted to the described embodiment. Other embodiments are conceivable, such as multi-cell radio systems, digital radio systems with FDMA or CDMA radio transmission, or wireless in-house communication systems.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Radio communication system (SYS) with a stationary radio device (DBS) and mobile radio device (MMS), with both devices exchanging information with each other via a radio link (RIF) according to a radio protocol (PGSM) of a public land mobile network (PLMN), wherein first radio signals (FB) are provided for exclusive transmission by the stationary radio device (DBS) and second radio signals are provided for exclusive transmission by the mobile radio device (MMS), wherein
for establishing the radio link (RIF), at least one of the radio devices (MMS) transmits, in the opposite direction of the public radio protocol (PGSM), one of the radio signals (FB) which, according to the public radio protocol, are actually for transmission by the other radio device (DBS) in a radio channel designated for exclusive use by said other radio device.

2. Radio communication system (SYS) according to claim 1, characterized in that the predetermined radio protocol is a radio protocol (PGSM) predetermined for a public mobile radio system (PLMN), and that the stationary radio device (DBS) monitors the radio channels assigned to the public mobile radio system (PLMN) and informs the mobile radio device (MMS) about free radio channels to be used in a private radio communication system (SYS).

3. Radio communication system (SYS) according to claim 1, characterized in that the predetermined radio protocol is a radio protocol (PGSM) predetermined for a public mobile radio system (PLMN), and that the radio devices (DBS, MMS) continuously and alternately occupy the radio channels which are assigned to the public mobile radio system (PLMN), to be used in a private radio communication system (SYS).

4. Radio communication system (SYS) according to claim 1, characterized in that the mobile radio device (MMS) transmits one of the first radio signals (FB) which contains a data value which is actually determined by the stationary radio device (DBS) based on measurements of radio signals received by the stationary radio device and transmitted to the mobile radio device, and that the mobile radio device (MMS) allocates this data value outside a tolerance range which is supposed to be observed according to the PGSM.

5. Radio communication system (SYS) according to claim 4, characterized in that the data value actually corresponds to a frequency deviation measured by the stationary radio device (DBS), wherein the frequency deviation indicates the deviation of the transmission frequency of the mobile radio device (MMS) from the receiver frequency of the stationary radio device (DBS) and is actually transmitted by the stationary radio device (DBS) to the mobile radio device (MMS) to correct the transmission frequency.

6. Radio communication system (SYS) according to claim 1, characterized in that the mobile radio device (MMS) repeatedly transmits one of the first radio signals (FB) until the stationary radio device (DBS) answers.

7. Radio communication system (SYS) according to claim 1, characterized in that at least one of the radio devices (DBS, MMS) repeatedly transmits in the opposite direction of the radio protocol (PGSM) one of the radio signals (FB1) which are only supposed to be transmitted once by the radio device.

8. Mobile radio device (MMS) for a radio communication system (SYS) with a stationary radio device (DBS) which exchanges radio signals with the mobile radio device (MMS) via a radio link (RIF) according to a radio protocol (PGSM) of a public land mobile network (PLMN), wherein first radio signals (FB) are provided for exclusive transmission via the stationary radio device (DBS) and second radio signals are provided for exclusive transmission by the mobile radio device (MMS), wherein for setting up the radio link (RIF), the mobile radio device (MMS) transmits, in the opposite direction of the radio protocol (PGSM), one of the first radio signals (FB) which, according to the public radio protocol, are actually for transmission by the stationary radio device (DBS) in a channel designated for exclusive use by said stationary radio device.

9. Stationary radio device (DBS) for a radio communication system (SYS), wherein the stationary radio device (DBS) exchanges radio signals with a mobile radio device (MMS) via a radio link (RIF) according to a radio protocol (PGSM) of a public land mobile network (PLMN), wherein first radio signals (FB) are provided for exclusive transmission by the stationary radio device (DBS) and second radio signals are provided for exclusive transmission by the mobile radio device (MMS), wherein for setting up the radio link, the stationary radio device transmits, in the opposite direction of the radio protocol, one of the second radio signals which, according to the public radio protocol, are actually for transmission by the other radio device in a channel designated for exclusive use by said other radio device.

10. Method (100) for setting up a radio link (RIF) in a radio communication system (SYS) with a stationary radio device (DBS) and a mobile radio device (MMS), both of which exchanging radio signals with each other according to a radio protocol (PGSM) of a public land mobile network (PLMN), wherein first radio signals (FB) are provided for exclusive transmission by the stationary radio device (DBS) and second radio signals are provided for exclusive transmission by the mobile radio device (MMS), wherein in a first step (110) for setting up the radio link (RIF) at least one of the radio devices (MMS) transmits, in the opposite direction of the public radio protocol (PGSM) one of the radio signals (FB) which, according to the public radio protocol, are actually for transmission by the other radio device (DBS) in a radio channel designated for exclusive use by said other radio device.

* * * * *

UNITED STATES PATENT AND TRADEMARK OFFICE
CERTIFICATE OF CORRECTION

PATENT NO : 6,108,522
DATED : August 22, 2000
INVENTOR(S): Gero Blanke

It is certified that error appears in the above-identified patent and that said Letters Patent are hereby corrected as shown below:

At column 8, line 41, after "(PGSM)", please insert --,--.

Signed and Sealed this

Twenty-fourth Day of April, 2001

Attest:

NICHOLAS P. GODICI

Attesting Officer

Acting Director of the United States Patent and Trademark Office